March 3, 1953 — W. H. VOIGT — 2,630,099
ANIMAL TREATMENT SUPPORT
Filed Aug. 18, 1950 — 2 SHEETS—SHEET 1

INVENTOR.
WILLIAM H. VOIGT,
BY McMorrow, Berman & Davidson
ATTORNEYS.

March 3, 1953 W. H. VOIGT 2,630,099
ANIMAL TREATMENT SUPPORT
Filed Aug. 18, 1950 2 SHEETS—SHEET 2

INVENTOR.
WILLIAM H. VOIGT,
BY
McMorrow, Berman + Davidson
ATTORNEYS.

Patented Mar. 3, 1953

2,630,099

UNITED STATES PATENT OFFICE 2,630,099

ANIMAL TREATMENT SUPPORT

William H. Voigt, Bell, Calif.

Application August 18, 1950, Serial No. 180,284

3 Claims. (Cl. 119—103)

This invention relates to animal husbandry devices, and more particularly to a support for facilitating the treatment of animals.

An object of this invention is to provide an adjustable support which is particularly adapted to hold hogs or pigs in an inverted position for various treatments, such as vaccination, deworming, castration, ringing and the like.

Another object of this invention is to provide an adjustable support which is provided with means for holding the rear legs of an animal in spaced-apart condition to thereby facilitate the treatment of the animal.

A further object of this invention is to provide a hog-holding support which can be readily adjusted to accommodate various sizes of hogs and to hold the hogs against lateral and longitudinal displacement therein.

A still further object of this invention is to provide a support for facilitating the treatment of animals which is relatively simple in structure, easy to operate, and cheap to manufacture.

The above and still further objects and advantages of the present invention will become apparent upon consideration of the following detailed description of the invention, when taken in conjunction with the accompaying drawings, wherein.

Figure 1:
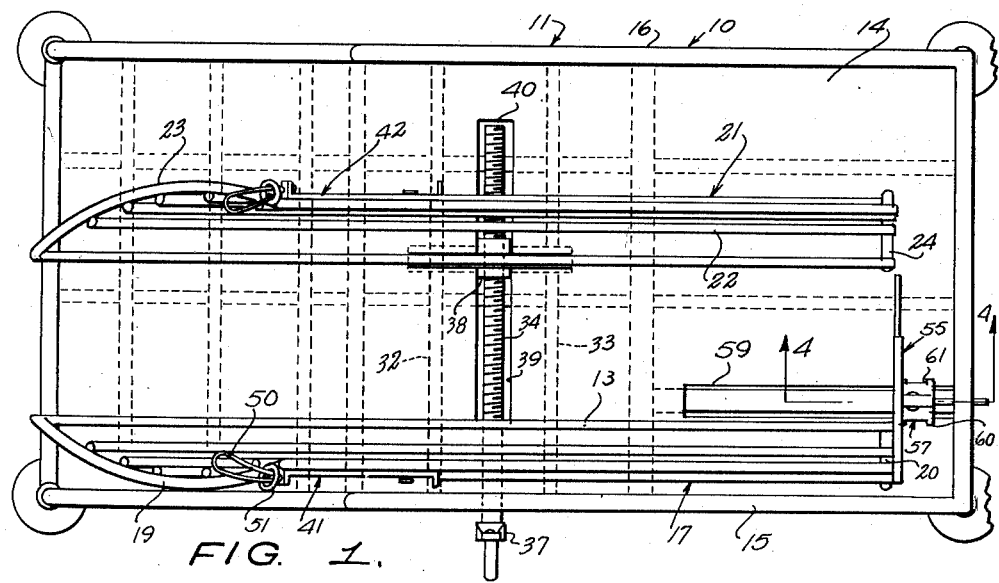
Figure 1 is a top plan view of the adjustable animal support of the present invention.
Figure 2:
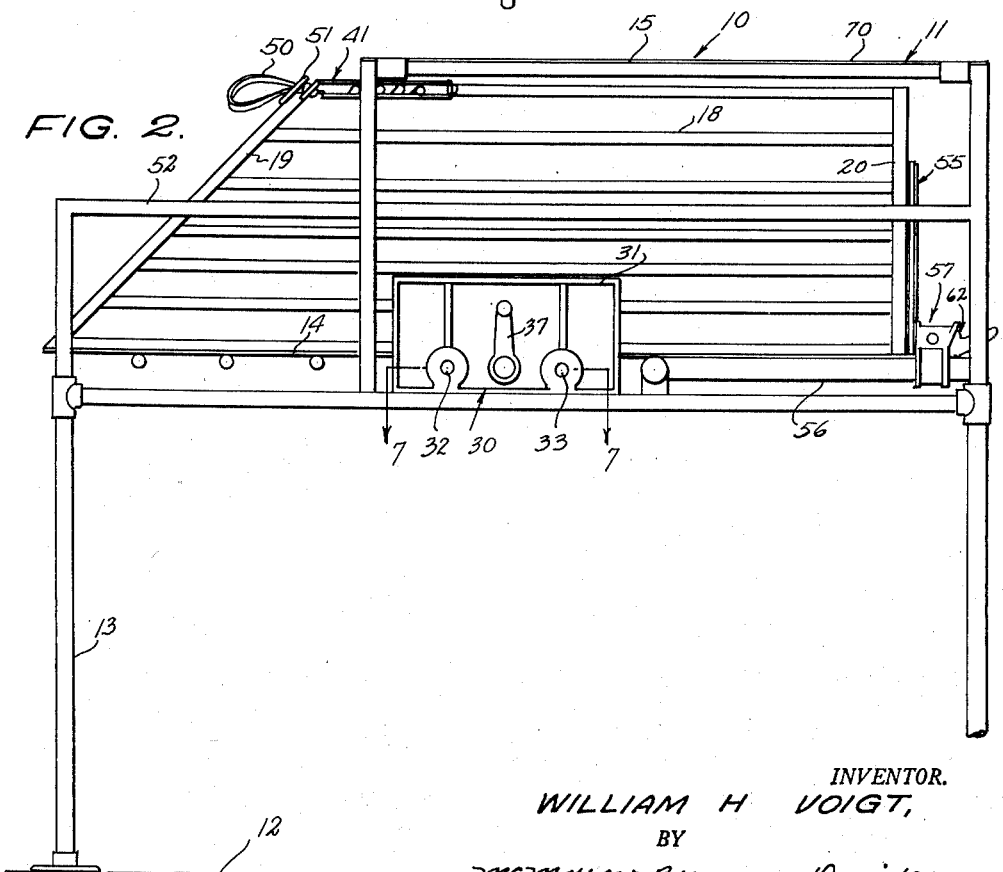
Figure 2 is a side elevational view of the adjustable animal support shown in Figure 1.

Referring now more particularly to the drawings, wherein like reference numerals have been used throughout the several views to designate like parts, there is shown the animal support of the present invention, generally designated by the numeral 10, which embodies a frame 11 having an open top and open ends. The frame 11 is supported in spaced relation above a ground surface 12 by means of the detachable legs 13 and embodies a substantially flat bottom or floor 14 and a pair of spaced-apart, vertically extending, open framework side walls or sides 15 and 16.

Positioned longitudinally within the frame 11 contiguous to and spaced from the side wall 15 thereof is a fixed jaw 17 which is shaped to conform to the side of the animal to be held and embodies a plurality of spaced, horizontally disposed rods 18 supported intermediate the end rods 19 and 20.

Disposed in face-to-face, spaced relation with respect to the fixed jaw 17 is a movable jaw 21 which is shaped to conform to the opposite side of the animal to be supported for movement toward and away from the fixed jaw 17. The movable jaw 21 likewise embodies a plurality of horizontally disposed rods 22 which are disposed in spaced-apart relation with respect to each other and supported between the end rods 23 and 24.

Figure 3:
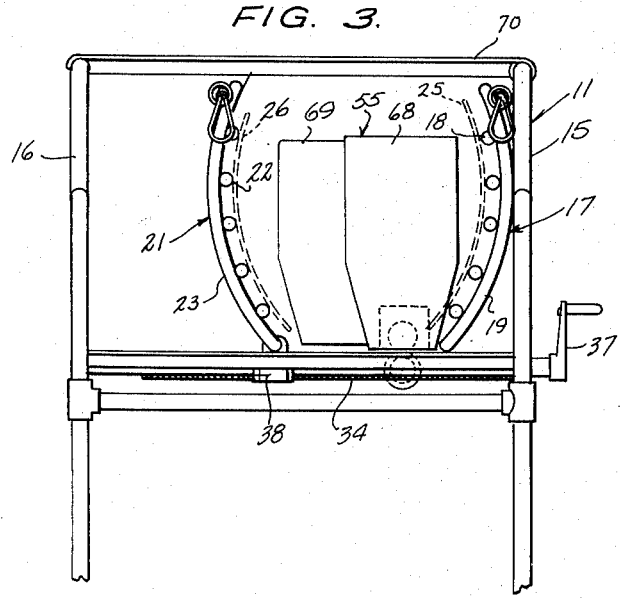
Figure 3 is an end elevational view of the adjustable animal support of the present invention taken from the left of Figures 1 and 2.

As illustrated in Figure 3, by phantom lines, and designated by the reference numerals 25 and 26, the confronting faces of the jaws 17 and 21 may be provided with a protective lining to prevent the direct contact between the sides of the animal and the bars 18 and 22 of the jaws 17 and 21.

Figure 7:
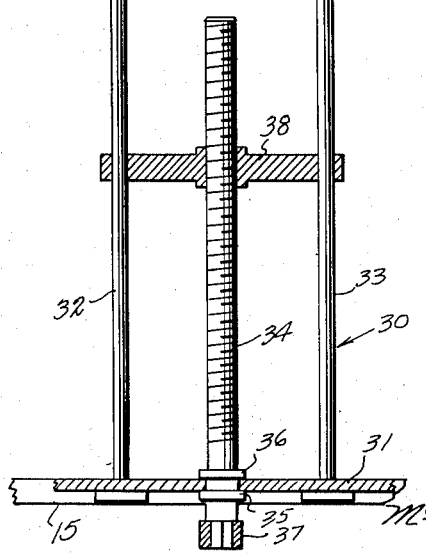
Figure 7 is a sectional view taken along the line 7—7 of Figure 2.

Operatively connected to the movable jaw 21 is a manually actuated structure, generally designated by the reference numeral 30, which is operable exteriorly of the frame 11 for actuating the movable jaw 21 into a select position wherein the animal is held against lateral displacement between the fixed jaw 17 and the movable jaw 21. The manually actuated structure 30 embodies a plate 31 which abuts against and is secured to the side 15 of the frame 11. Disposed transversely of the frame beneath the bottom 14 thereof and supported on the frame and the plate 31 is a pair of spaced guide bars 32 and 33. Positioned intermediate the guide bars 32 and 33 is a spirally threaded feed screw 34 which is rotatably journaled intermediate its end on the plate 31 by means of the spaced collars 35 and 36 and has one end projecting exteriorly of the frame 11 and supporting a handle 37. Disposed transversely of the exteriorly projecting end of the feed screw 34 and threadedly engaging the latter is an elongated head 38 which has each of its ends guidingly supported by the guide bars 32 and 33, as clearly illustrated in Figure 7. Accordingly, upon effecting the rotary movement of the feed screw 34, the head 38 which carries the movable jaw 21 will be moved along the feed screw 34 to thereby selectively position the movable jaw 21 with respect to the fixed jaw 17. As clearly shown in Figure 1, the bottom 14 of the frame 11 is provided with a transversely extending slot 39 which permits the connection of the head 38 to the movable jaw 21 and further limits the movement of the movable jaw 21 away from the fixed jaw. In the latter connection, it is to be noted that the terminating end 40 of the slot 39 is positioned contiguous to the free end of the feed screw 34 and will engage the head 38 to maintain the latter against displacement from its supported position on the feed screw 34.

Figure 5:
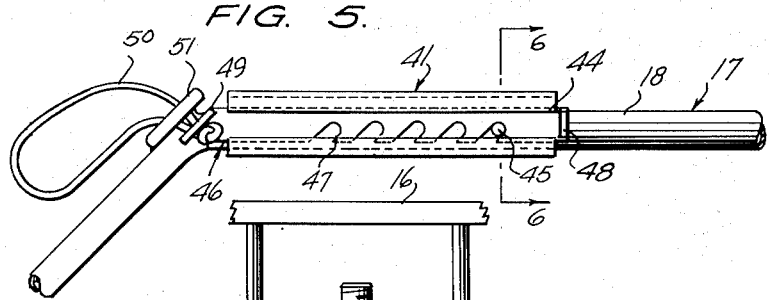
Figure 5 is an enlarged fragmentary elevational view showing one of the securing means forming a part of the adjustable animal support of the present invention.
Figure 6:
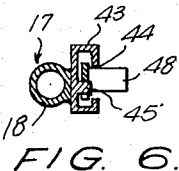
Figure 6 is a sectional view taken along the line 6—6 of Figure 5.

Carried on the jaws 17 and 21 contiguous to the end bars 19 and 23 thereof are the securing elements 41 and 42 for engagement with and securement to the adjacent portion of the animal to be supported. Since the securing elements 41 and 42 are of like construction, it will suffice to describe only one in detail. Referring now with particularity to Figures 5 and 6, there is shown one of the securing elements 41 which embodies a channel bar 43 having one side secured longitudinally of the horizontal rod 18 of the fixed jaw 17 and having the other side provided with a longitudinally extending slot 44. The channel bar 43 is rectangular in cross-section and is provided with an interiorly disposed, transversely extending pin 45 which projects toward the slot 44. Positioned within the channel bar 43 and movable longitudinally thereof is an elongated slide plate 46 which is provided with a plurality of longitudinally spaced, inclined notches 47 for selective engagement with the pin 45 of the channel bar 43. One end of the plate 46 is bent into a position normal to the plate to thereby form a grip 48 and the other end of the plate 46 is bent to form a securing lug 49. Carried by the securing lug 49 of the plate 46 is an open hitch 50 which is extended through a guide ring 51 provided on the adjacent portion of the jaw 17, the hitch being engageable with the rear leg of the animal. Accordingly, the hitches of the securing elements 41 and 42 can be engaged about the rear legs of the animal to hold the legs in spaced-apart condition which permits the easy treatment of the animal.

To further facilitate ready access to the hind portion of the animal intermediate the rear legs thereof, the adjacent ends of the side walls 15 and 16 of the frame 11 are notched, as designated generally by the reference numeral 52. The adjacent ends of the fixed and movable jaws 17 and 21 are formed with the end bars 19 and 23 thereof disposed at an angle to permit the user to readily insert his arms between the spread-apart legs of the animal.

Figure 4:
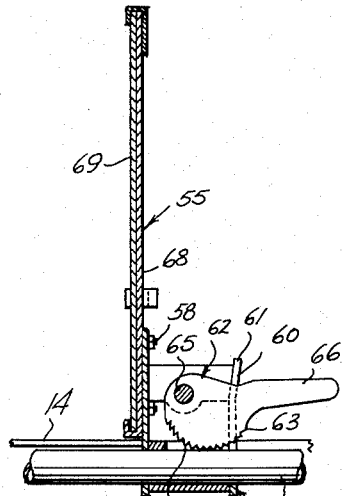
Figure 4 is an enlarged fragmentary sectional view taken along the line 4—4 of Figure 1.

Contiguous to the other open end of the frame is an end gate 55 which is engageable to the adjacent portion of the animal and cooperates with the securing elements 41 and 42 to hold the animal against longitudinal displacement. The end gate 55 is disposed transversely of the frame 11 and is mounted on the latter for movement from said other open end of the frame toward an intermediate portion of the frame contiguous to and spaced from the feed screw 34. To facilitate the mounting of the end gate 55, a supporting pipe 56 is positioned beneath the bottom 14 of the frame 11 and is secured to the adjacent portions of the frame. Circumposed about the supporting pipe 56 is a carriage or collar 57 which is slidable along the pipe 56 and carries the end gate 55 by means of the bolts 58. The bottom 14 of the frame 11 is provided with a longitudinally extending slot 59 which permits the operative connection of the collar 57 to the end gate 55 and further limits the movement of the end gate toward the intermediate portion of the frame, as previously described in conjunction with the head 35 and the slot 39. As clearly shown in Figure 4, the collar 57 includes a hollow extension 60 which is provided with a longitudinally extending slot 61 in which is pivotally supported a toothed keeper 62. The keeper 62 includes a camming head 63 which is provided with the teeth 64 along the peripheral surface thereof contiguous to the pipe 56, the camming head being pivotally mounted on the extension 60 by means of the transversely extending bolt 65. The camming head carries an extension 66 forming a handle which permits the keeper 62 to be rotated out of its position in engagement with the pipe 56. It is to be noted that the keeper 62 is biased into engagement with the pipe 56 by resilient means, not shown, and further has its teeth disposed so that, upon urging the end gate toward the adjacent open end of the frame 11, a tighter engagement will be effected between the teeth and the pipe 56. Accordingly, any movement of the animal within the support which would tend to urge the end gate 55 toward the adjacent open end of the frame 11 will tend to more firmly secure the end gate in a select position of its sliding movement. The sliding movement of the end gate 55 with respect to the securing elements 41 and 42 permits the support to be longitudinally adjusted to accommodate any size of animal and to hold the animal against longitudinal displacement. For example, when supporting a hog in an inverted position, the hind legs of the hog can be engaged by the hitches 50 of the securing elements 41 and 42, and the end gate 55 brought into a position bearing against the snout and adjacent head portions of the hog to thereby maintain the hog against movement longitudinally with respect to the support.

The end gate 55 includes a first section 68 which is positioned adjacent to the fixed jaw 17 and a second section 69 mounted on the first section 68 for transverse extensile and retractile movement toward and away from the movable jaw. Accordingly, the opening between the fixed and movable jaws 19 and 21 can be substantially constricted in the various select positions of movement of the movable jaw 21.

In actual use, the frame 11 is transported to any convenient place and set up on the detachable legs 13. The movable jaw is then moved away from the fixed jaw 17 by imparting a rotary movement to the feed screw 34, whereupon the inverted pig or hog can be supported longitudinally between the jaws 17 and 21 with the hind legs of the animal contiguous to the securing elements 41 and 42. The hitches 50 of the securing elements 41 and 42 are then engaged over the legs of the hog and the securing elements adjusted to a position wherein the hog's legs are effectively spread apart to facilitate ready access to the hind quarter of the animal. The end gate 55 is then selectively positioned to bear against the adjacent portions of the hog to thereby cooperate with the securing elements 41 and 42 to maintain the hog against longitudinal displacement. The end gate 55 is then adjusted to substantially constrict the adjacent opening between the fixed and movable jaws 17 and 21. A detachable cover 70 can then be extended across the open top of the frame 11 from a point contiguous to the end gate 55 to the securing elements 41 and 42. The cover 70 cooperates with the end gate 55 to substantially enclose the body of the animal exposing only the hind portions thereof. It is to be noted, however, that the cover will not be employed when performing such operations as deworming and ringing, but rather only when castrating the hog under which circumstances it is very likely that blood will be splattered about.

Although only one embodiment of the adjustable animal support of the present invention has been described, it is readily apparent that numerous modifications can be made without departing from the spirit of the invention as set forth in the appended claims.

What I claim is:

1. In a support for holding an animal, a frame including a horizontally disposed floor and a pair of spaced upstanding sides carried by said floor, a first fixed vertically disposed jaw positioned longitudinally of and above said floor adjacent to one of said sides, there being a first slot in said floor extending transversely inwardly from one side edge thereof and terminating at a point spaced from the other side edge of said floor, a second vertically disposed jaw positioned longitudinally of and above said floor and movable toward and away from said first jaw, feed means arranged adjacent to and in alignment with said first slot operatively connected to said second jaw and supported on said frame for effecting the movement of said second jaw relative to said first jaw, there being a second slot in said floor extending longitudinally inwardly from one end thereof and terminating at a point spaced from the other end of said floor, a carriage positioned adjacent to and in alignment with said second slot and supported on said frame for longitudinal reciprocatory movement, an upstanding gate arranged transversely of and above said floor and having its lower end connected to said carriage, and an extension positioned adjacent said gate and connected to said gate for extensile and contractile movement.

2. In a support for holding an animal, a frame including a horizontally disposed floor and a pair of spaced upstanding sides carried by said floor, a first fixed vertically disposed jaw positioned longitudinally of and above said floor adjacent to one of said sides, there being a first slot in said floor extending transversely inwardly from one side edge thereof and terminating at a point spaced from the other side edge of said floor, a second vertically disposed jaw positioned longitudinally of and above said floor and movable toward and away from said first jaw, spaced parallel guide bars disposed transversely beneath said floor adjacent to said first slot and secured to said sides, a feed screw rotatably journaled in one of said sides, said feed screw being arranged below and in alignment with said first slot and having one end projecting exteriorly of said one side, a handle connected to said one end of said feed screw, a head in threaded engagement with said feed screw and slidably supported on said guide bars and connected to said second jaw, there being a second slot in said floor extending longitudinally inwardly from one end thereof and terminating at a point spaced from the other end of said floor, a carriage positioned adjacent to and in alignment with said second slot and supported on said frame for longitudinal reciprocatory movement, and upstanding gate arranged transversely of and above said floor and having its lower end connected to said carriage, and an extension positioned adjacent said gate and connected to said gate for extensile and contractile movement.

3. In a support for holding an animal, a frame including a horizontally disposed floor and a pair of spaced upstanding sides carried by said floor, a first fixed vertically disposed jaw positioned longitudinally of and above said floor adjacent to one of said sides, there being a first slot in said floor extending transversely inwardly from one side edge thereof and terminating at a point spaced from the other side edge of said floor, a second vertically disposed jaw positioned longitudinally of and above said floor and movable toward and away from said first jaw, spaced parallel guide bars disposed transversely beneath said floor adjacent to said first slot and secured to said sides, a feed screw rotatably journaled in one of said sides, said feed screw being arranged below and in alignment with said first slot and having one end projecting exteriorly of said one side, a handle connected to said one end of said feed screw, a head in threaded engagement with said feed screw and slidably supported on said guide bars and connected to said second jaw, complemental flexible loop means carried by each of said jaws adjacent one end thereof for holding the legs of an animal spread apart, each of said loops being independently adjustable to vary the size thereof, there being a second slot in said floor extending longitudinally inwardly from the end thereof remote from said one end of said jaws and terminating at a point spaced from the other end of said floor, a carriage positioned adjacent to and in alignment with said second slot and supported on said frame for longitudinal reciprocatory movement, an upstanding gate arranged transversely of and above said floor and having its lower end connected to said carriage, and an extension positioned adjacent said gate and connected to said gate for extensile and contractile movement.

WILLIAM H. VOIGT.

REFERENCES CITED

The following references are of record in the file of this patent:

UNITED STATES PATENTS

| Number | Name | Date |
| --- | --- | --- |
| 252,112 | Lowry et al. | Jan. 10, 1882 |
| 1,073,756 | Higgason | Sept. 23, 1913 |
| 1,445,487 | Clark | Feb. 13, 1923 |
| 1,717,531 | Trees | June 18, 1929 |
| 1,717,532 | Trees | June 18, 1929 |
| 2,279,012 | Packchanian | Apr. 7, 1942 |
| 2,477,213 | Staggs | July 26, 1949 |